Patented Sept. 1, 1942

2,294,779

UNITED STATES PATENT OFFICE 2,294,779

CONTACT DECOLORIZATION

Julius Hyman, Chicago, Ill., assignor to Velsicol Corporation, Chicago, Ill., a corporation of Illinois No Drawing. Application November 22, 1939, Serial No. 305,676

8 Claims. (Cl. 196—147)

This invention relates to the decolorization in the liquid phase of water-insoluble, naphtha-soluble substances, such as animal, vegetable, marine and mineral oils, waxes and resins both of volatile and non-volatile nature, and is characterized in that it uses for the purposes of decolorization synthetic, porous granular silicates comprising aluminum ion, such as synthetic aluminum silicate.

This application is a continuation-in-part of my co-pending application Serial No. 174,656 which application is a continuation-in-part of my application Serial No. 81,685 which was copending therewith and issued to Patent No. 2,137,492 on November 22, 1938.

Heretofore certain natural aluminosilicates have been used very extensively for the purposes above mentioned. Such natural silicates, however, have been found unsatisfactory for the reason that they must be used with their impurities, and are further undesirable because of their friability and their naturally occurring ratios of aluminum to silicon. At best, their porosities and strength can be altered comparatively slightly.

As opposed to these defects, synthetic aluminosilicates may be prepared in practically any degree of purity, and their strength, porosities and aluminum-silicon ratios may be varied within wide limits. These advantages are extremely important, as it is thus possible to prepare catalytic, porous aluminosilicates best suited for each specific requirement.

The degree of porosity is of primary importance in the production and use of synthetic aluminosilicates. In the case of decolorizing agents, only those synthetic alumina silicates appear usable whose porosities are such as to permit ready entrance of the tinctorial bodies. This porosity is reflected generally in the apparent density of the catalyst, the lower the apparent density the greater being the porosity. Tests which I have made indicate that the maximum apparent density of an active synthetic aluminum silicate should be less than 60, the apparent density being defined as the weight in pounds of a cubic foot of unpacked material which is dry to the touch and has a screen size between 8 and 80 mesh, over 50% of which being of a screen size between 30 and 60 mesh.

Silicates may be precipitated as gels from an alkaline, neutral or acid solution. Alumino-silicates precipitated in an alkaline solution usually possess pronounced base-exchange, or zeolite properties. The neutral and acidic gels show the same property to a lesser degree. Such silicates must be freed of water-soluble alkali before they will function as color adsorbents. This may be accomplished, for example, by washing or boiling the granular silicate with an aqueous solution of a salt of a polyvalent metallic ion (said ion comprising the cation of the salt) until all excessive alkali has been neutralized. The desired results may also be obtained by washing the aluminosilicate with an aqueous solution of an ammonium salt, washing out the excess of the salt with water, and heating the treated silicate to break down the ammonium aluminosilicate complex and drive off the liberated ammonia. Very mildly acid washings may also be used to remove replaceable alkali. As a pre-treatment in preparing synthetic zeolites to function as adsorbents, it is well first to wash away with water as much alkali and occluded salts as conveniently possible.

The porosity of the alumino-silicate gels may be increased by the addition of water-soluble foreign materials prior to precipitation. After the gel has set, these water-soluble materials may be leached away, thus leaving minute voids which tend to increase the surface—and hence the porosity—of the final dried gel. Voids may also be created by the addition of substances, such as ammonium nitrite, to the gel-forming solutions, which substances tend to gasify on the application of mild heat. This heat may then be applied during the drying and setting period of the gel.

The strength of a synthetic aluminosilicate depends not only on its method of preparation, but also on the ratio of silica to alumina. Other things being equal, the rule is that the greater the percentage of silica in the gel, the stronger and more rigid it will be. However, when the ratio by weight of alumina ($Al_2O_3$) to silica ($SiO_2$) falls below 1 to 25, the quantity of alumina present is so reduced that the gel ceases for practical purposes to be sufficiently active for the uses herein contemplated. On the other hand, when the ratio by weight of alumina to silica rises above equality, the resulting gel is too frangible for ordinary commercial use. An alumina-silica ratio of 1 to 6 appears quite satisfactory for most purposes herein mentioned.

Oils may be decolorized with synthetic alumino-silicates either by the familiar methods of contact filtration or percolation. In the former, adsorbent dust of 100–300 mesh fineness (occasionally coarser material is used) is combined with the oil to form a slurry. This is generally heated to 100–600° F., depending on the viscosity and general nature of the oil, and kept at these temperatures for carrying times up to three or four hours. A commonly used temperature for many oils is 300° F. with a half hour contact time.

After appropriate cooling, the oil slurry is then piped to a filter press or vacuum filter, where the separation of oil from spent adsorbent is effected. The adsorbent cake may be treated with naphtha to wash out residual oil held by the cake. Under proper conditions, the adsorbent used in contact filtration may be reactivated by ignition; although the general practice is to discard the fine adsorbent. It may also be treated with strong oxidizing agents, such as hot diluted hydrogen peroxide or potassium permanganate solution, which oxidize the impurities adhering to the adsorbent, and thus reactivate it.

In the treatment of oils by percolation the oils are passed through a bed of the adsorbent, which will vary from about 8 to 100 mesh in size. As in contact filtration, the temperature of the oil and the time of contact will depend on such factors as the viscosity of the oil, its tendency to decompose, the nature of the colored bodies to be removed, and economic considerations. Because of its size, the spent adsorbent may be readily reactivated by calcining at about 1200° F. in a current of air. Experiments indicate that after a primary calcining the synthetic aluminosilicates may be recalcined as often as desired, without serious reduction in decolorizing and/or polymerizing activity, provided the adsorbents are not sintered in the calcining. However, synthetic aluminosilicates appear to be much more stable than the nationally occurring aluminosilicates in this respect.

It will also be seen that an adaptation of the percolation method may be utilized in the decolorization and filtering of automobile lubricating oils during operation of the motor vehicle, by using a filter cell containing my synthetic aluminum silicate adsorbent and continuously by-passing through it oil from the crank case of the automobile.

The decolorization of resins, fats and waxes may be accomplished either by treating them in a molten condition in the aforementioned manners, or preferably by first dissolving them in an appropriate hydrocarbon solvent, such as petroleum naphtha. In order to prevent the naphtha from evaporating, it may be necessary to carry out the decolorizing treatment under super-atmospheric pressures.

Examples of oils amenable to adsorptive decolorization are Mid-Continent lubricating oil fractions, crude cottonseed oil and crude neat's foot oil.

Examples of decolorizable solids are dark varieties of rosin, coumarone-indene resins and petroleum resins.

I claim as my invention:

1. In the decolorization treatment of naphtha-soluble, water-insoluble hydrocarbon substances chosen from the class consisting of oils, waxes and resins, the step which comprises subjecting said substances in the liquid phase to the adsorptive action of a solid, porous, homogeneous, synthetic alumino-silicate gel from which all replaceable and water-soluble alkali has previously been removed.

2. In the decolorization treatment of naphtha-soluble, water-insoluble hydrocarbon oils, waxes and resins, the step which comprises subjecting said substances in the liquid phase to the adsorptive action of a solid, porous, homogeneous, synthetic alumino-silicate gel from which all replaceable and water-soluble alkali has previously been removed, said aluminium silicate containing a weight ratio of alumina to silica between approximately 1:1 to 1:25 and being much more stable than naturally occurring alumino-silicates against loss of activity upon repeated calcining.

3. In the decolorization treatment of naphtha-soluble, water-insoluble waxes, resins and the like hydrocarbon substances, the step which comprises subjecting said substances in the liquid phase to the adsorptive action of a solid, porous, homogeneous, synthetic alumino-silicate gel from which all replaceable and water-soluble alkali has previously been removed, which has been calcined in air.

4. In the decolorization treatment of naphtha-soluble hydrocarbons, the step which comprises subjecting said hydrocarbons in the liquid phase to the adsorptive action of a solid, porous, homogeneous, synthetic alumino-silicate gel from which all replaceable and water-soluble alkali has previously been removed.

5. In the decolorization treatment of mineral oils, the step which comprises subjecting said oils in the liquid phase to the adsorptive action of a solid, porous, homogeneous, synthetic alumino-silicate gel from which all replaceable and water-soluble alkali has previously been removed.

6. In the decolorization treatment of lubricating oil fractions of hydrocarbon oils, the step which comprises subjecting said fraction in the liquid phase to the adsorptive action of a solid, porous, homogeneous, synthetic alumino-silicate gel from which all replaceable and water-soluble alkali has previously been removed.

7. In the decolorization treatment of hydrocarbon resins, the step which comprises subjecting said resins in the liquid phase to the adsorptive action of a solid, porous, homogeneous, synthetic alumino-silicate gel from which all replaceable and water-soluble alkali has previously been removed.

8. In the decolorization and filtering of automobile lubricating hydrocarbon oils during the operation of the motor vehicle, the step which consists of passing a portion of said oil continuously through a bed of granular porous adsorbent comprising a solid, porous, homogeneous, synthetic alumino-silicate gel from which all replaceable and water-soluble alkali has previously been removed.

JULIUS HYMAN.